(12) United States Patent
Igawa et al.

(10) Patent No.: US 6,513,620 B2
(45) Date of Patent: Feb. 4, 2003

(54) STEERING VALVE DEVICE

(75) Inventors: Hideki Igawa, Kariya (JP); Mitsuhiro Tanaka, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/732,681

(22) Filed: Dec. 8, 2000

(65) Prior Publication Data

US 2001/0013368 A1 Aug. 16, 2001

(30) Foreign Application Priority Data

Dec. 27, 1999 (JP) ............................................ 11-370255

(51) Int. Cl.$^7$ ................................................ B62D 5/99
(52) U.S. Cl. ...................................... 180/422; 180/421
(58) Field of Search ................................. 180/421, 422, 180/417, 441; 91/375 A, 437–439, 375 R

(56) References Cited

U.S. PATENT DOCUMENTS

| 4,418,779 | A | * | 12/1983 | Nakayama et al. | ......... 180/141 |
| 4,606,423 | A | | 8/1986 | Fujiwara et al. | ........... 180/79.1 |
| 4,703,819 | A | | 11/1987 | Hosotani | .................... 180/132 |
| 4,779,418 | A | * | 10/1988 | Artzberger | .................. 60/444 |
| 4,982,803 | A | * | 1/1991 | Kervagoret | ................. 180/132 |
| 5,072,584 | A | * | 12/1991 | Mauch et al. | .................. 60/378 |
| 5,121,807 | A | * | 6/1992 | Adams | ........................ 180/143 |
| 5,165,496 | A | | 11/1992 | Pedersen et al. | ............ 180/132 |
| 5,263,321 | A | | 11/1993 | Thomsen et al. | ............. 60/384 |
| 5,275,251 | A | | 1/1994 | Thomsen et al. | ........... 180/142 |
| 5,638,912 | A | * | 6/1997 | Haga et al. | .................. 180/417 |
| 5,845,222 | A | * | 12/1998 | Yamamoto et al. | ........... 701/41 |
| 5,845,737 | A | * | 12/1998 | Suzuki et al. | ................ 180/441 |
| 5,960,694 | A | * | 10/1999 | Thomas et al. | ............ 91/363 R |
| 6,148,947 | A | * | 11/2000 | Eberhart et al. | ............. 180/441 |
| 6,193,009 | B1 | * | 2/2001 | Chino et al. | ................. 180/441 |
| 6,202,410 | B1 | * | 3/2001 | Nakashima | ................... 60/433 |
| 6,354,790 | B1 | * | 3/2002 | Cummings et al. | .......... 414/729 |

FOREIGN PATENT DOCUMENTS

| DE | 44 38 259 A1 | 5/1995 | ............ B62D/6/04 |
| DE | 197 45 897 A1 | 4/1999 | ............ B62D/5/06 |
| EP | 0 818 380 A2 | 1/1998 | ........... B62D/5/083 |
| EP | 0 872 405 A2 | 10/1998 | ............ B62D/5/06 |
| EP | 0 818 380 A3 | 5/1999 | ........... B62D/5/083 |
| EP | 0 872 405 A3 | 3/2001 | ............ B62D/5/06 |
| JP | 3-30544 | 4/1991 | |
| JP | 4-24270 | 4/1992 | |
| JP | 7-5364 | 2/1995 | |
| JP | 9-39815 | 2/1997 | |
| JP | 9-39816 | 2/1997 | |
| JP | 9-39817 | 2/1997 | |
| JP | 9-39818 | 2/1997 | |
| JP | 9-39819 | 2/1997 | |

* cited by examiner

*Primary Examiner*—Paul N. Dickson
*Assistant Examiner*—L. Lum
(74) *Attorney, Agent, or Firm*—Morgan & Finnegan, LLP

(57) ABSTRACT

The object of the present invention is to offer a steering valve device which can reduce both space of the valve assembly in the vehicle and increment of cost and time for manufacturing the device.

The steering valve device has a main valve and a correction valve in a housing. The main valve has a supply port, a drain port, and a pair of a right and a left outlets. The main valve is constructed such that either of the right and the left outlets allows to flow the hydraulic fluid, and the other allows to receive the hydraulic fluid according to an operation of a steering wheel. The correction valve has a communicating passage to communicate the right and the left outlets, and a ball to open and close the communicating passage.

6 Claims, 4 Drawing Sheets

STEERING VALVE DEVICE

BACKGROUND OF THE INVENTION

The present invention relates to a steering valve device to correct a deviation between a steering wheel and steered wheels of a motor vehicle.

A power steering device 90 arranged to assist in the turning of steered wheels 34 in response to the rotational operation of steering wheel 4, as shown in FIG. 4, is known in the art. The power steering device 90, which includes a hydraulic control circuit in which there are a hydraulic source such as a pump 2 and a tank 21, a power steering valve 91 connected to the source, and a power steering cylinder (hereinafter a PS cylinder) 3 connected to the valve 91 by means of hoses 911, 912, operates to turn steered wheels 34 left and right. In response to rotational operation of the steering wheel 4, the steering valve 91 distributes fluid from the source to either a right or left chamber of the PS cylinder 3 and returns fluid from the other chamber to the source according to the rotational direction 41 of the steering wheel 4. The PS cylinder then turns the steered wheels 34 in the direction 31 corresponding to the fluid distribution.

The steering wheel 4 has a knob 43 thereon by which an operator can ascertain the steering angle of the wheel 4 reflecting the angle of the steered wheels 34. However, there is a situation when the knob 43 incorrectly indicates the angle of the steered wheels 34; that being when there is a deviation in the relative angular positions of steering wheel 4 and steered wheels 34 due to a leakage of hydraulic fluid from the circuit. To replenish the hydraulic fluid, the hydraulic circuit further includes a correction valve 92 between the steering valve 91 and the PS cylinder 3. The correction valve 92 shortens the hoses 911, 912, as discussed in Japanese Examined Patent Publication Nos. 3-30544 and 4-24270 and Japanese Examined Utility Model Publication No. 7-5364. A controller 5 and sensors 32, 42 are further provided for detecting angles of the steered wheel 34 and the steering wheel 4, respectively. The controller 5 controls the valve 92 to be open and close based on signals from the sensors 32, 42 indicating whether there is a deviation in the position relation between the steering wheel 4 and the steered wheels 34. Accordingly, the knob position of the steering wheel 4 is corrected by the opening and closing control of the correction valve 92.

However, the conventional power steering device 90 has the several disadvantages. First, the power steering valve 91 and the correction valve 92 are arranged in the respective housings 93, 94 that are disposed away from each other. This layout is inconvenient because separate parts have to be placed in the limited space. Second, piping, such as a hose, is needed between the power steering valve 91 and the correction valve 92. The inclusion of such piping increases manufacturing costs and assembling time.

SUMMARY OF THE INVENTION

It is an object of the present invention to provide a steering valve device for reducing both the space necessary for the device in the vehicle, and the costs and time for manufacturing the device.

A steering valve device of the present invention comprises a main valve having a supply port to which hydraulic fluid is supplied from a hydraulic source, a drain port from which the fluid is drained to the source, and a pair of right and left outlets either of which allows the fluid to flow into the cylinder and the other of which allows to receive the fluid from the cylinder, the main valve being operable in response to an operation of the steering wheel, a communicating passage for communicating the right outlet with the left outlet, a correction valve for opening and closing the communicating passage, and a housing in which the main valve, the communicating passage, and the correction valve are arranged.

The most remarkable point of the present invention is that the main valve, the communicating passage and the correction valve are arranged together in the housing.

The operation and effect of the present invention will now be explained.

As mentioned above, the steering valve device has a housing containing both the main valve and the correction valve. Therefore, the steering valve device not only controls supply and drain of the hydraulic fluid acting on the PS cylinder by means of the main valve, but also opens the communicating passage by means of the correction valve, so that it can resolve the bias of the oil volume between the right and left outlets.

Unlike the conventional device, the steering valve device of the present invention requires no hose connection between the main valve and the correction valve. It is apparent not only that a fluid leakage between the main and correction valve rarely occurs, but that assembling the device into the vehicle is less complicated. Thus, it can reduce both space for the valve assembly in the vehicle, and the costs and time for manufacturing the device.

Furthermore, the housing may comprise a first housing accommodating the main valve and a second housing accommodating the correction valve while the first and second housings are detachably fastened to each other. This invention provides easy machining of the communicating passage in the housing and maintenance of the device.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

First Embodiment

Figure 1:
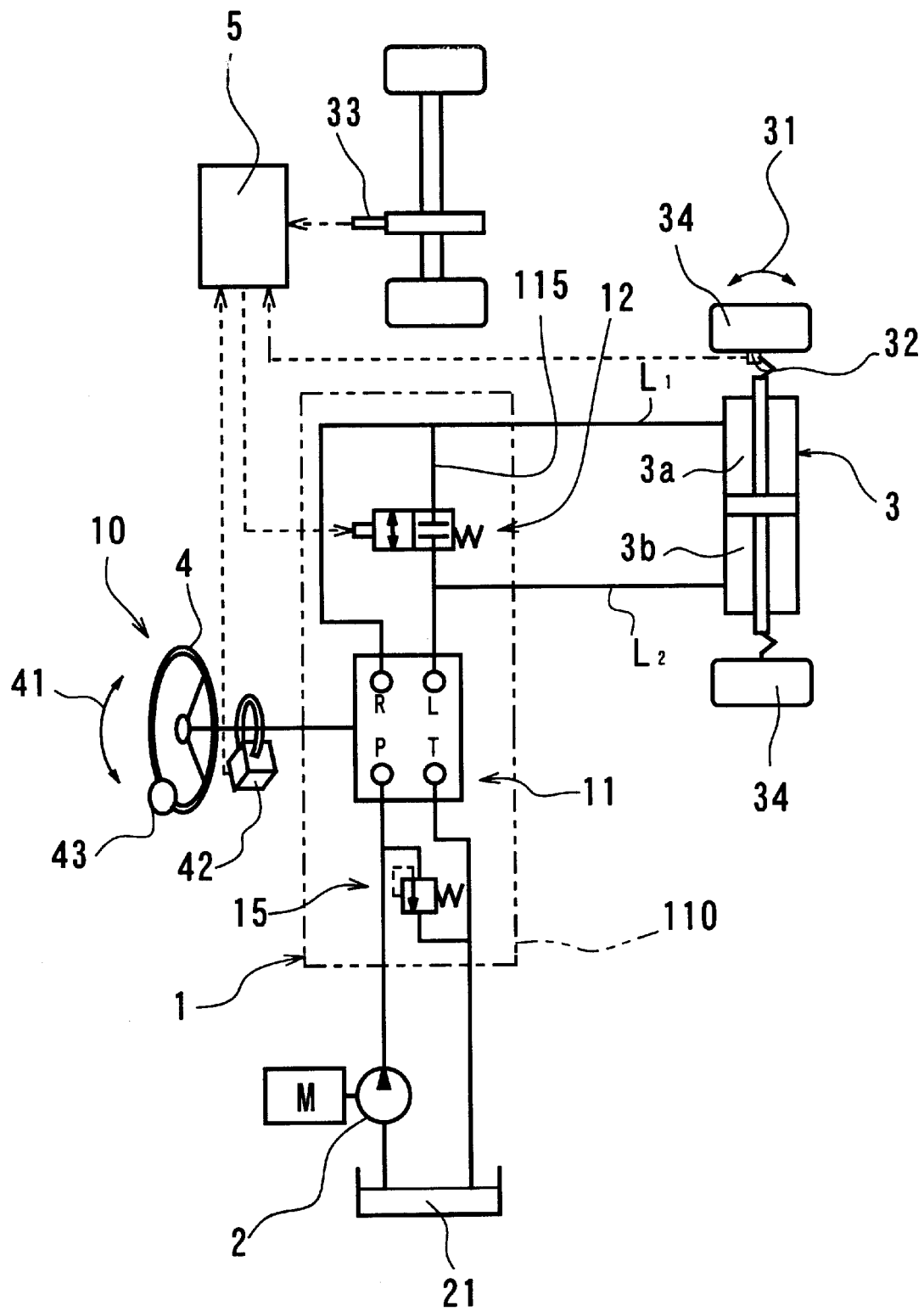
FIG. 1 is an exemplary diagram illustrating a steering valve device according to a first embodiment of the present invention.
Figure 2:
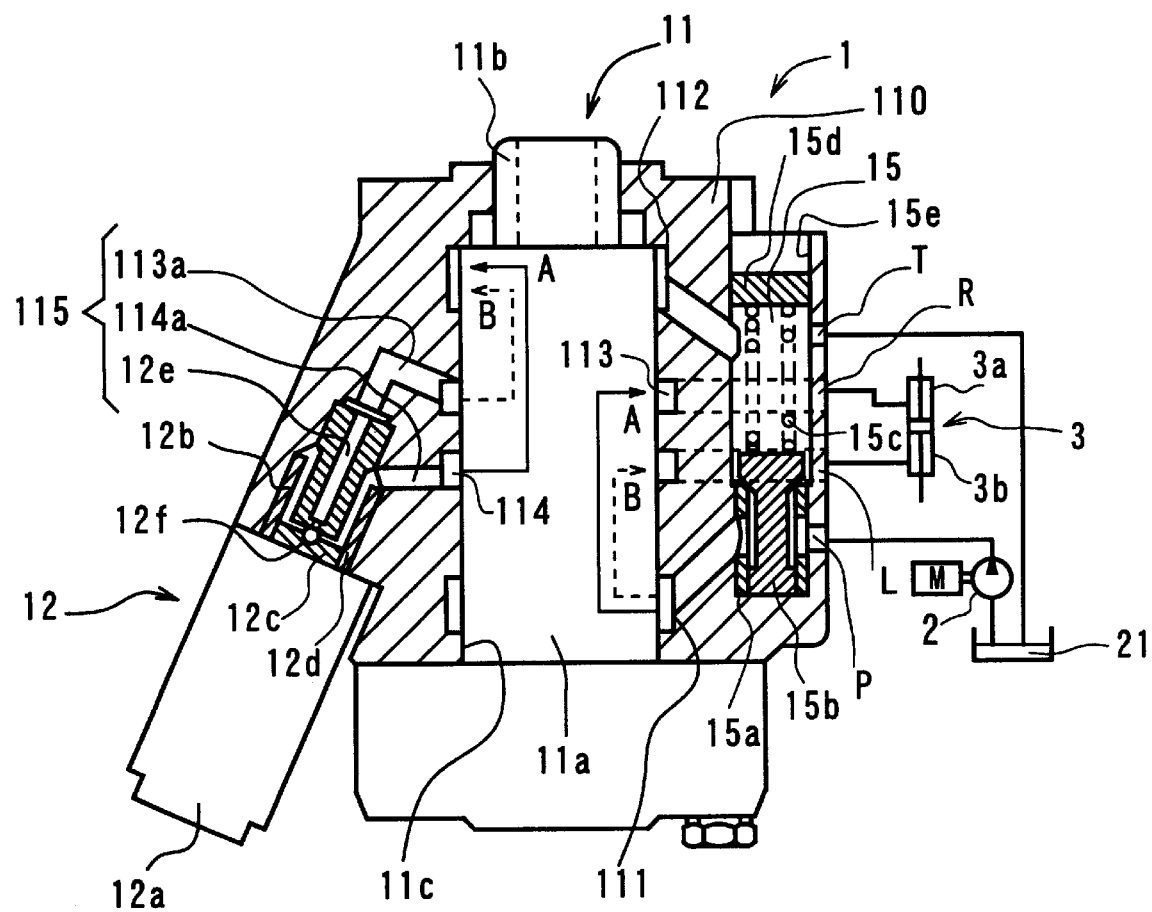
FIG. 2 is a cross-sectional view illustrating a structure of a steering valve device according to a first embodiment of the present invention.

Referring to the accompanying drawings, a first embodiment of a steering valve device 1 is described in FIGS. 1 and 2.

FIG. 1 shows a steering device 10 of a vehicle such as a forklift truck. The steering device 10 includes a steering wheel 4 coupled with the steering valve device 1 and steered wheels 34 to be operated by the steering wheel 4. The steered wheels 34 are coupled with a power steering cylinder (hereinafter a PS cylinder) 3. The steering wheel 4 has a knob 43 thereon. The knob 43 indicates a rotational angle of the steering wheel 4 which corresponds to a steered angle of the steered wheels 34.

The steering valve device 1 comprises a hydraulic circuit and an electrical circuit. The hydraulic circuit includes a main valve 11 connected to a pump 2, and a tank 21 as a hydraulic source. The main valve 11 has a supply port P, to which hydraulic fluid is supplied from the pump 2, and a drain port T from which the fluid returns to the tank 21. The main valve 11 further has a right outlet R and a left outlet L connected to the PS cylinder 3.

The PS cylinder 3 defines right and left chambers 3a, 3b therein. A pair of piston rods protruding from the respective right and left chambers 3a, 3b each support a steered wheel 34. The right and left chambers 3a, 3b are connected to the respective right and left outlets R, L of the main valve 11. Therefore, the wheels 34 turn left or right according to fluid distribution from the main valve 11 to the left or right chamber 3a, 3b of the cylinder 3.

There is a communicating passage 115 between the main valve 11 and the PS cylinder 3 which allows for the communication of hydraulic fluid between connection lines $L_1$, $L_2$. The passage 115 short-circuits the lines $L_1$ and $L_2$. A correction valve 12 is provided on the communicating passage 115. The correction valve 12 opens and closes the passage 115.

In the electrical circuit there are a controller 5 mounted on the vehicle, a tire sensor 32 for detecting the steered angle of the wheel 34 and a steering sensor 42 for detecting the steering angle of the wheel 4. The controller 5 includes a memory (not shown) having information about a position relation between the angles of steering wheel 4 and steered wheel 34. Preferably, the memory has the relation between the angle of steered wheel 34 and the corresponding target position with respect to the knob 43.

The controller 5 first determines the target position of the knob 43 based on the detected angle of the steered wheel 34 and the information about a position relation between the angles of steering wheel 4 and steered wheel 34. The controller 5 then compares the target position and the detected position of the knob 43 and determines whether there is a deviation between the target position and the detected position of the knob 43. When such a deviation is found, the controller 5 opens the correction valve 12 during a predetermined time period in order to eliminate the deviation. The vehicle also has a speed sensor 33. The controller 5 may stop performing the above control of the correction valve 12 when a signal from the speed sensor 33 indicates that the speed of the forklift exceeds a predetermined speed.

As shown in FIG. 2, the main valve 11 and the correction valve 12 are accommodated in a housing 110. A main valve chamber 11c is defined in the housing 110 to contain the main valve 11. The chamber 11c has four recesses along an inner surface of the chamber 11c. The top and bottom recesses 112, 111 are connected to the drain and supply ports T, P, respectively. The middle recesses 113, 114 are connected to the right and left outlets R, L, respectively. The main valve 11 has a rotational valve body 11a and at its top an input gear portion 11b coupling with a shaft (not shown) extending from the steering wheel 4. When the valve body 11a is rotated by the wheel 4 and the shaft, the valve body 11a switches fluid lines A and B (schematically shown in FIG. 2) defined on the body 11a. The line A serve to distribute the fluid from the pump 2 to the right chamber 3a of the PS cylinder 3 and to return the fluid from the left chamber 3b to the tank 21, whereas the line B serves to distribute the fluid from the pump 2 to the left chamber 3b of the PS cylinder 3 and to return the fluid from the right chamber 3a to the tank 21.

A correction valve chamber 12d is defined in the same housing 110 to accommodate the correction valve 12. The chamber 12b is connected to both the middle recesses 113 and 114 by means of passages 113a and 114a.

The correction valve 12 is an electrical magnetic valve having a solenoid 12a. The valve 12 further includes a valve case 12b fitting in the chamber 12d and a moveable member 12c. The case 12b has a passage 12e therein. The moveable member 12c has a ball 12f fixed at the top of the member 12c to be reciprocated by the solenoid 12a. The ball 12f can open and close the passage 12e according to the solenoid 12a. The passages 113a, 114a and 12e constitute the communicating passage 115.

A relief valve 15 is provided in a relief valve chamber 15e defined in the housing 110. The valve 15 comprises a case 15a fitting to the chamber 15e, a spool type valve body 15b slidable in the case 15a, a cap 15d threaded into the chamber 15e, and a spring 15c in a spring room defined between the body 15b and the cap 15d. The body 15b has a neck portion which defines a space between the case 15a and the body 15b. This space communicates with both the supply port P and the bottom recess 111 of the housing 110 so that the fluid from the pump 2 is supplied to the bottom recess 111 through the space of the relief valve 15. The spring room is connected to both the drain port T and the top recess 112 of the housing 110 so that the fluid from the PS cylinder 3 returns to the tank 21 through the spring room. The spring force is set such that the valve body 15b disconnects the space from the spring room unless fluid pressure from the pump 2 exceeds a predetermined value.

The operation of the steering valve device 1 of the first embodiment is now explained as follows.

When rotation of the steering wheel 4 is transmitted to the main valve 11 by means of the steering shaft, the valve 11 selects the right outlet R or the left outlet L in response to the rotational direction of the steering wheel 4. The fluid from the pump 2 is then supplied to the right or left chamber 3a, 3b of the PS cylinder 3 so that the steered wheels 34 turns in the same direction as the steering wheel 4.

The sensors 42, 32 detect the rotational angles of the steering wheel 4 and the steered wheels 34, respectively, and output the corresponding signals to the controller 5. The sensor 33 detects the speed of the forklift and outputs its signal to the controller 5. The controller 5, in which a predetermined relation between the knob position and the steered wheel angle is set, determines a target position of the knob 43 based on the signals from the sensors 32, 42 and the relation preset. The controller 5 calculates any deviation between the target and the detected positions of the knob 43.

When fluid leakage occurs in the hydraulic circuit, the knob position slips and indicates its incorrect position that does not correspond to the actual angle of the steered wheel 34. Then, the deviation, a difference between the detected position and the target position of the knob 43, is found by the controller 5. If the deviation over the predetermined value is found, the controller 5 outputs a signal at certain timing to open the correction valve 12. The moveable member 12c and the ball 12f of the valve 12 is actuated by solenoid 12a, and opens the passage 12e. Opening the passage 12e allows fluid flow between the right outlet R and the left outlet L through the passages 113a, 12e and 114a, thereby correcting the knob position to its target position.

In practice, the controller 5 opens the correction valve 12 when the steering wheel 4 rotates in a direction that the knob 43 comes close to the target position the controller 5 calculates. Opening the valve 12 makes a short circuit between the right outlet R and the left outlet L so that hydraulic fluid flows from either one of the outlets R or L to the other. That is, the PS cylinder 3 is not responsive to the steering wheel 4 during a period of the time the correction valve 12 opens, despite of rotation of the steering wheel 4. When the controller 5 finds that the knob 43 reaches the target position based on the detected angle of the steered wheel 34, the controller 5 commands the correction valve 12 to be closed. After that, the PS cylinder 3 becomes responsive to the steering wheel 4 in a condition where the deviation between the target and actual positions of the knob 43 is eliminated.

On the other hand, if the steering wheel 4 rotates in an opposite direction that the knob 43 goes far away from the target position, it would take too long for the knob 43 to reach the target. In this situation, the correction valve 12 remains closed even though the deviation exists, and the PS cylinder responds to the steering wheel 4 with the deviation continuing.

Moreover, when the speed sensor 33 detects the running speed of the forklift exceeds a predetermined value, the controller 5 does not open the correction valve 12 even when the deviation is found. Furthermore, the controller 5 dose not open the correction valve 12 when the rotational speed of the steering wheel 4 is too fast or when the angle of the steered wheels 34 is too large.

Second Embodiment

Figure 3:
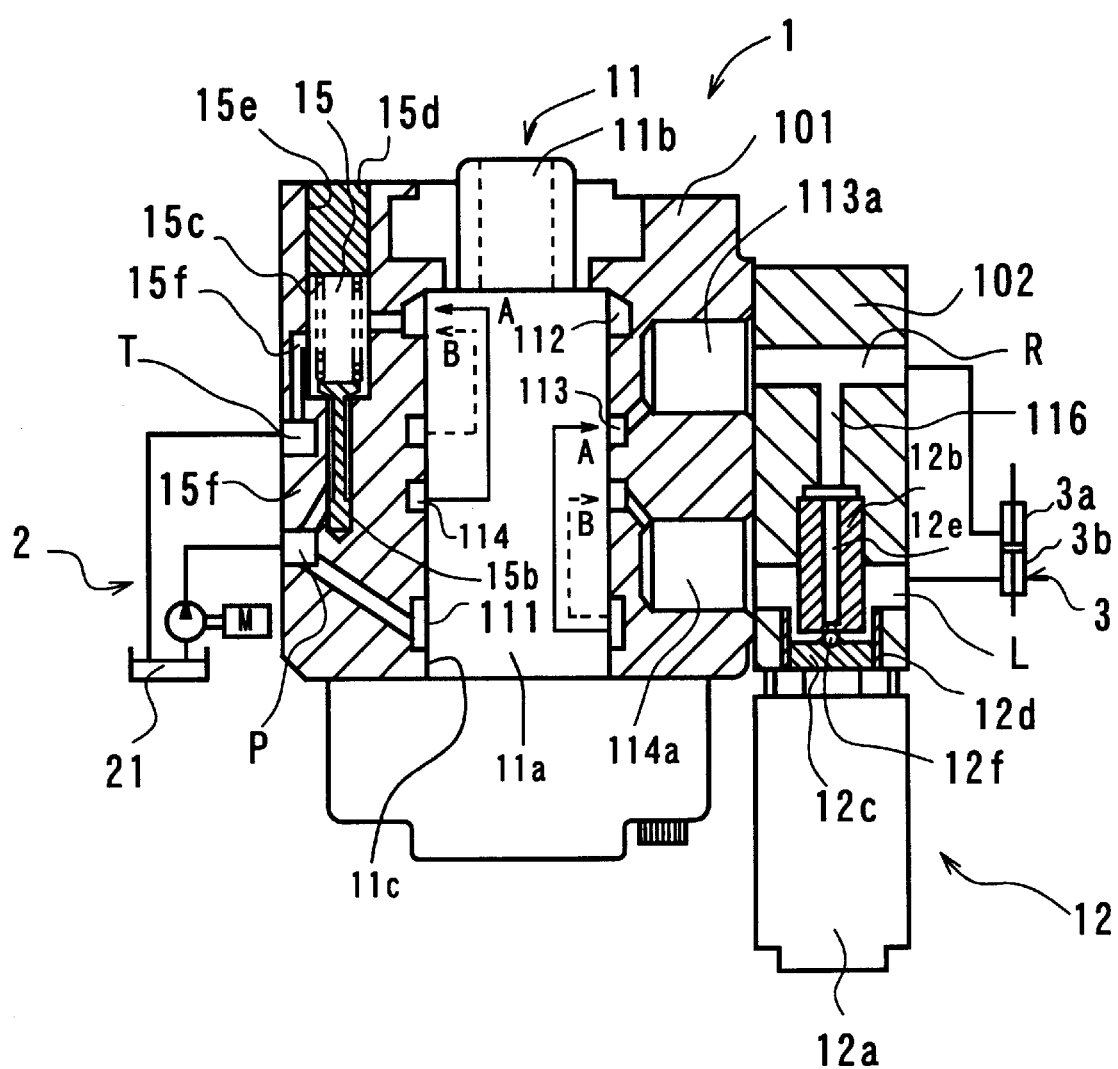
FIG. 3 is a cross-sectional view illustrating a structure of a steering valve device according to a second embodiment of the present invention.
Figure 4:
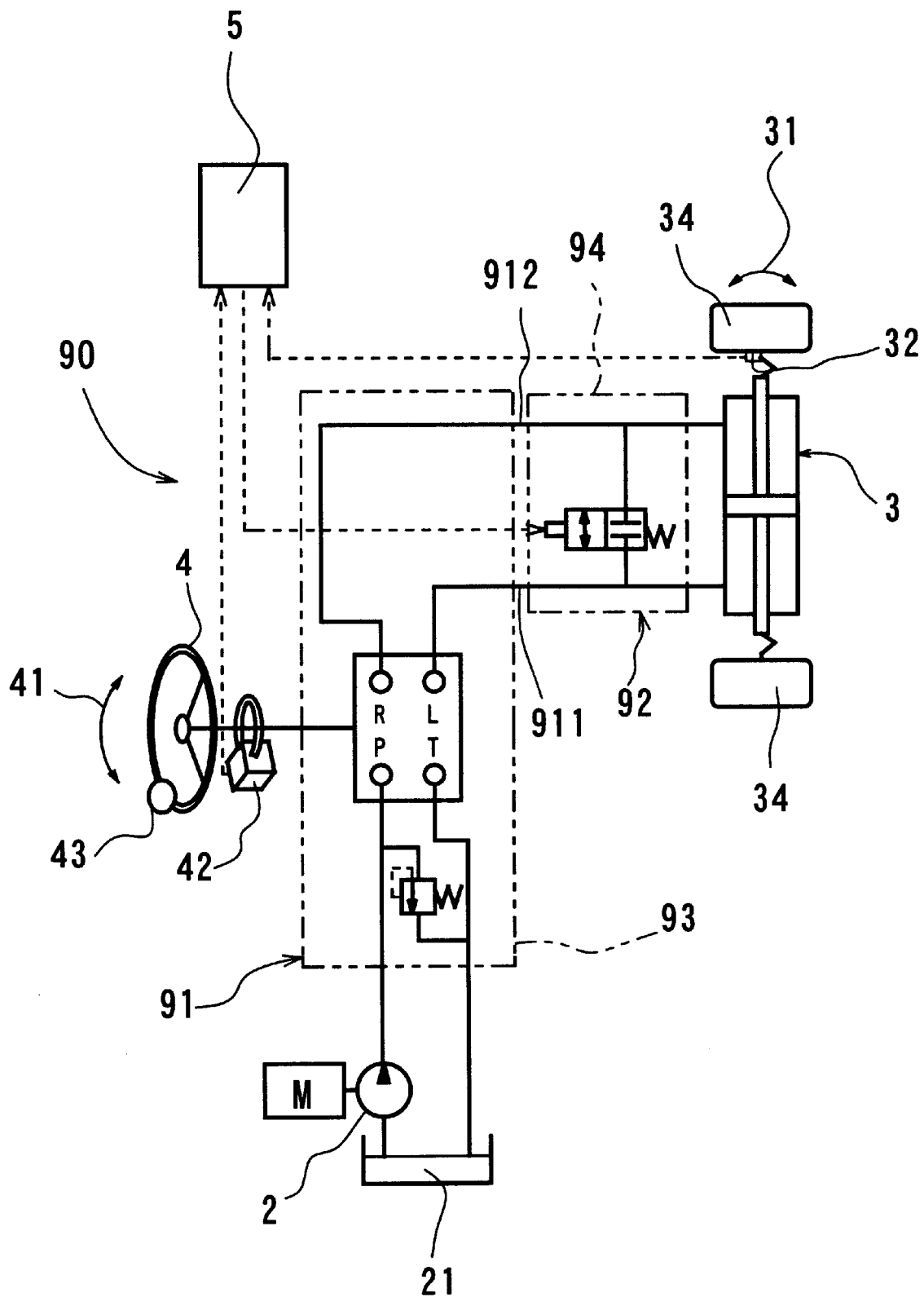
FIG. 4 is an exemplary diagram illustrating a conventional steering valve device.

Referring now to FIGS. 1 and 3, a steering valve device of a second embodiment is described. The device of the second embodiment also employs the same hydraulic circuit and electrical circuit as the first embodiment. A significant difference from the first embodiment is that the housing comprises a first housing 101 and a second housing 102 which are detachably fastened together by means of bolts (not shown).

A main valve 11 and a correction valve 12 both of which are substantially the same as ones in the first embodiment are accommodated in the first and second housings 101, 102, respectively. The first housing 101 has passages 113a, 114a each connected to respective middle recesses 113, 114 formed in a main valve chamber 11c. The passages 113a, 114a open to an adjoining surface of the first housing 101. The first housing 101 further has a relief valve 15 which opens and closes a connection passage 15f connecting the supply port P to the drain port T. The second housing 102 has a right outlet R and a left outlet L each connected the respective passages 113a, 114a. A communicating passage is formed in the second housing 102. The communicating passage comprises a branch 116 extending from the right outlet R and a passage 12e formed in the correction valve 12. The communicating passage is opened and closed by the correction valve 12, in particular, by a ball 12f of the valve 12, in response to a signal from the controller 5 to a solenoid 12a.

In this embodiment, as the main valve 11 and the correction valve are detachable from each other, it is a further advantage to improve maintenance by separating them. As mentioned above, the present invention proposes a steering valve device which can save space and reduce the costs and assembling time for manufacturing the steering valve device.

The present examples and embodiments discussed above are to be considered as illustrative and not restrictive and the invention is not to be limited to the details given herein but may be modified

What is claimed is:

1. A steering valve device arranged between a steering wheel of a vehicle and a power steering cylinder assisting steered wheels of the vehicle to be turned left and light, and connected to the steered wheels, the device comprising:

a main valve having a supply port to which hydraulic fluid is supplied from a hydraulic source, a drain port from which the hydraulic fluid is drained to the source, and a pair of right and left outlets either of which allows the hydraulic fluid to flow into the cylinder and the other of which allows the hydraulic fluid to flow out of the cylinder, said main valve being connected with the steering wheel so as to be operable in response to operation of the steering wheel;

a communicating passage for communicating the right outlet with the left outlet;

a correction valve for opening and closing said communicating passage; and a housing in which said main valve, said communicating passage and said correction valve are arranged.

2. The steering valve device according to claim 1, wherein said housing comprises a first housing accommodating said main valve, and a second housing accommodating said correction valve, and wherein said first housing and said second housing are detachably connected.

3. A steering valve device arranged between a steering wheel of a vehicle and a power steering cylinder assisting steered wheels of the vehicle to be turned left and right, the device distributing hydraulic fluid supplied from a hydraulic source to the cylinder according to the rotation of the steering wheel, the device comprising:

a housing having supply and drain ports each connected to the hydraulic source and left and right outlets each connected to the cylinder, the housing defining valve chambers therein;

a main valve disposed in one of the valve chambers, said main valve distributing the hydraulic fluid supplied from the hydraulic source to either the left or right outlet;

a communicating passage defined in said housing, said communicating passage communicating the left outlet with the right outlet; and a correction valve disposed in the other valve chamber of said housing, said correction valve being arranged to open and close said communicating passage.

4. The steering valve device according to claim 3, wherein said housing comprises a first housing and a second housing fastened to said first housing, said first housing accommodating said main valve, and said second housing accommodating said correction valve.

5. The steering valve device according to claim 4, wherein said first housing defines the supply port and the drain port therein, and wherein said second housing defines the right and left outlets therein.

6. The steering valve device according to claim 3, the device further comprising:

a first sensor for detecting an angle of the steering wheel, said first sensor outputting a signal corresponding to the detected angle of the steering wheel;

a second sensor for detecting an angle of the steered wheel, said second sensor outputting a signal corresponding to the detected angle of the steered wheel; and a controller for controlling said correction valve open and close according to the signals from both said sensors.

* * * * *